UNITED STATES PATENT OFFICE.

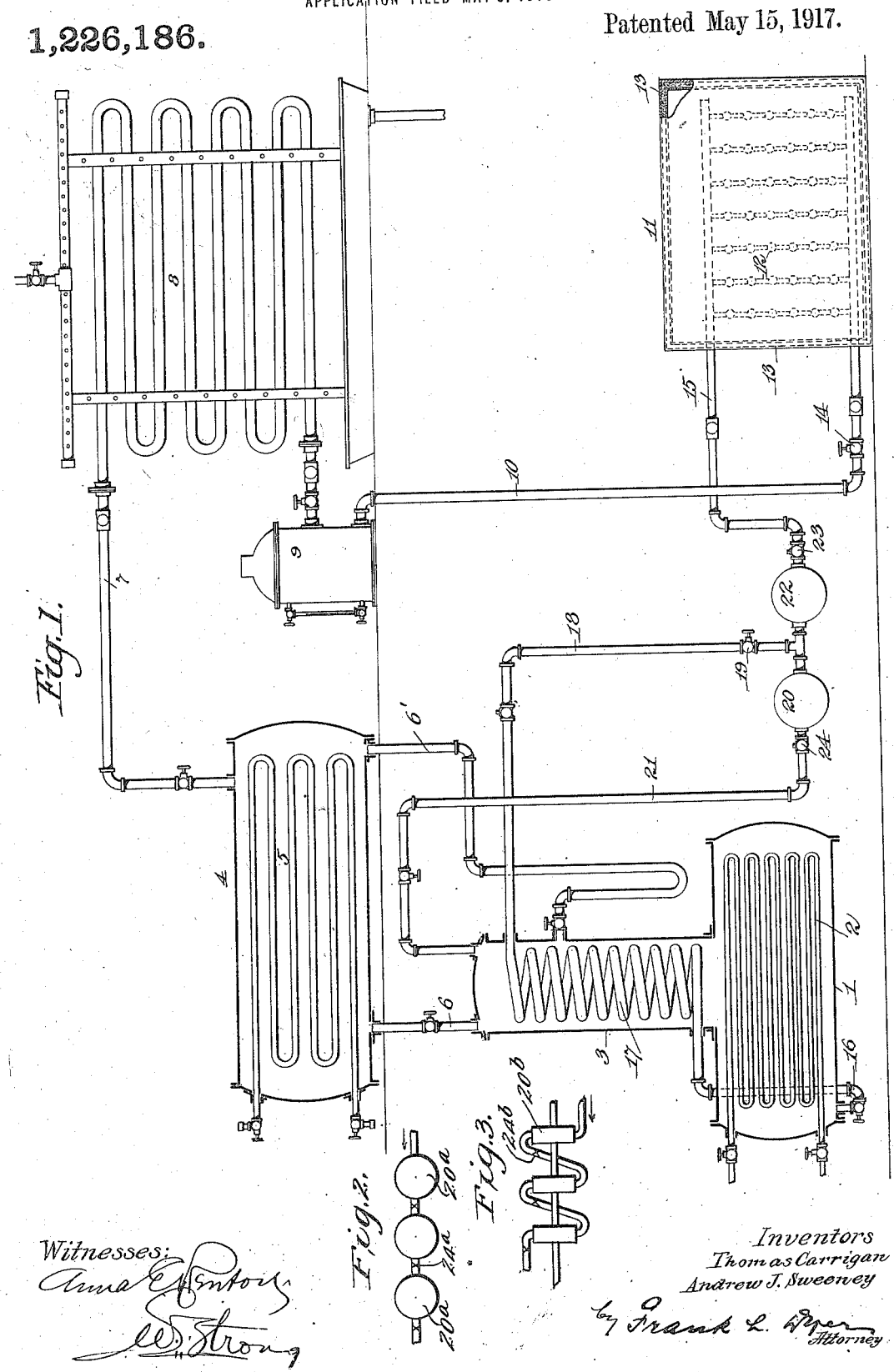

THOMAS CARRIGAN, OF NEW YORK, N. Y., AND ANDREW J. SWEENEY, OF BAYONNE, NEW JERSEY.

REFRIGERATING APPARATUS.

1,226,186.  Specification of Letters Patent.  Patented May 15, 1917.

Application filed May 5, 1916. Serial No. 95,521.

*To all whom it may concern:*

Be it known that we, THOMAS CARRIGAN, a citizen of the United States, residing in the city, county, and State of New York, and ANDREW J. SWEENEY, a citizen of the United States, residing at Bayonne, county of Hudson, State of New Jersey, have invented a certain new and useful Improvement in Refrigerating Apparatus, of which the following is a specification.

Our invention relates to various new and useful improvements in refrigerating apparatus of the absorption type and our object is to produce an apparatus which shall be very simply constructed and hence of certain and easy operation, relatively economical to install and of high efficiency. With our improved apparatus we do away entirely with the cumbersome and expensive absorbers ordinarily used, and we also overcome the objectionable loss in efficiency now due to the employment of absorbers in these systems.

Our present improvements can be applied to any desired construction or make of absorption system employing a generator, a condenser and an evaporator or cooling tank. Broadly stated the invention consists in the combination with any desired or suitable absorption system, of a mechanical device (such as a single or multi-stage pump or a series of rotary pumps) for maintaining a circulation of the liquor (aqua ammonia or equivalent refrigerant) generally from the bottom of the generator to the top thereof and in utilizing a mechanical device (such as a rotary pump or compressor) for forcing the gas drawn from the evaporator or cooling tank under a suitably regulated pressure and causing the gas so compressed to be absorbed by the circulating liquor before it enters the liquid pump which thus acts to return the strong liquor to the generator. We also employ a reducing valve in the circulating system by means of which the pressure on the weak liquor circulating from the generator is reduced to the pressure desired for bringing about the mixture therewith of the gas under pressure from the gas pump, and by means of the liquor pump the circulation will be maintained and the strong liquor forced back into the generator against the pressure therein. In this way we construct a very simple and efficient apparatus in which the loss of energy now taking place in the absorbers of absorption machines is practically entirely overcome.

In order that the invention may be better understood, attention is directed to the accompanying drawing forming part of this specification and in which, Figure 1 illustrates diagrammatically a suitable arrangement of absorption apparatus to which we have applied our present improvements, Fig. 2 a diagrammatic view illustrating a gang of three pumps arranged in series for effecting the circulation of the liquor into the generator, and Fig. 3 a similar view of a rotary pump arranged in three stages for the same purpose.

The generator 1 is of any suitable type, and is provided with the usual steam coils 2, or other means by which the aqua ammonia or other refrigerant is distilled. Mounted on the generator 1, is a cylinder tower 3 known in the trade as an analyzer and exchanger, the function of which will be explained, but which may be dispensed with if desired. Above the generator is a dehydrator 4 having cooling coils 5 therein for dehydrating the hot gas from the generator. Any water separated in the dehydrator flows back into the generator through the pipes 6 and 6' which connect the two. If desired the dehydrator may be dispensed with. Leading from the dehydrator if used, or if not used then directly from the generator, is a pipe 7 which connects with any well known form of condenser. The condenser illustrated comprises a coil over which cooling water is showered in the well known way. In the condenser 8 the dry gas is condensed being under pressure, as will be understood, and any surplus may accumulate in the usual receiver 9. From the lower end of the receiver a pipe 10 leads to an evaporator or cooling tank 11, of any suitable construction. The form illustrated is of a well known type comprising expansion coils 12 located in a brine tank 13. In the pipe 10 is the usual expansion or needle valve 14, by means of which the pressure will be reduced so as to permit the liquid refrigerant to expand in the form of a gas in the expansion coils 12 to thereby produce the refrigerating effect.

Preferably the expansion of the gas as shown commences at the bottom and progresses upwardly through the expansion coils 12, the expanded gas after refrigeration has been secured leaving the evaporator through the pipe 15.

Connected with the lower end of the generator 1 is a pipe 16, which connects with a coil 17 in the analyzer and exchanger 3. From the top of the coil 17 is an extension 18 having a reducing valve 19 therein, and by which the pressure of the circulating liquid can be reduced to the desired point to secure the maximum mixing effect as will be explained. Connected with the pipe 18 beyond the expansion valve 19 is a liquid pump 20, or other mechanical device for forcing the liquid back into the generator against the pressure thereof, and in this way complete the circulation. We preferably use a rotary pump for this purpose, for the reason that in the handling of strong ammonia solutions at relatively high temperatures, it is important that the circulating pressure should gradually and progressively increase from minimum to maximum without the danger of permitting any sudden expansion of the ammonia gas as would be likely to occur with reciprocating pumps. Furthermore, since a very considerable pressure requires to be imposed upon the liquid to force it back into the generator after its pressure has been reduced at the valve 19, we prefer to make use of a rotary pump having two or more stages, or two or more separate rotary pumps may be arranged in series so as to effect the gradual increase in pressure as will be understood. Thus, in Fig. 3 we illustrate a rotary pump formed in three stages 20$^b$, the stages being connected by pipes 24$^b$, and in Fig. 2 we illustrate three rotary pumps 20$^a$ arranged in series and connected by pipes 24$^a$. Preferably, check valves marked "$x$" are used to prevent back pressure between the stages in Fig. 3, or between the successive pumps in Fig. 2. Multiple stage pumps and two or more pumps connected in series are, of course, well known in many arts, so that details of construction do not require illustration. From the rotary pump or pumps 20 a pipe 21 leads into the upper part of the tower 3 whereby the strong liquor in entering the generator will be showered over the coil 17 and heat will thus be imparted to the strong liquor before reaching the generator.

In order to cause the expanded gas from the evaporator 11 to be mixed with the weak liquor after the pressure of the latter has been reduced by the valve 19, it is necessary that the gas shall be positively directed or forced into the weak liquor before the latter enters the pump or pumps 20 so as to be mixed therewith. For this purpose we use a gas pump 22, preferably of the rotary type, which imparts the desired pressure to the gas from the pipe 15 and forces the gas under pressure into contact with the weak liquor, whereby mixing will take place and the strong liquor thus produced will be forced, as explained, back into the generator. By thus using a mechanical device such as a rotary gas pump for imparting pressure to the gas, we provide for the certain and definite operation of the apparatus and for the mixing of the gas in the most efficient way in the weak liquor. Ordinarily the gas pump 22 will prevent any back pressure through the same, and the liquor pump 20 will prevent any back pressure from the generator through said pump. But to provide for any special emergency we prefer to make use of a check valve 23 on the suction side of the gas pump, and a check valve 24 on the discharge side of the liquor pump, so that in the event of any unexpected rise of pressure there may be no reversal of flow of the liquor or gas.

In the operation of our improved system we first charge the generator with the desired amount of aqua ammonia, or other refrigerant, and generate pressure therein so as to distil off the ammonia gas, any water being separated by the dehydrator if used. The pressure in the generator may, of course, vary within wide limits, but it will ordinarily be in the neighborhood of 180 pounds per square inch. In the dehydrator the temperature of the gas will be reduced sufficiently to condense any water, and in the condenser a further reduction in temperature will take place so as to result in a condensation of the gas in the usual way. At the same time a circulation of weak liquor from and strong liquor to the generator takes place through the pipe 16, coil 17, pipe 18, pump 20, and pipe 21, the pressure of the weak liquor being reduced to the desired point by the reducing valve 19. The reduction in pressure thus secured may also vary within wide limits, but we prefer to effect a reduction to about 50 pounds, more or less. While the liquid circulation is thus being maintained, the gas pump 22 is operating and takes the expanded gas from the evaporator, forcing the gas under pressure into contact with the circulating weak liquor so that the gas is mixed therewith both before and during the passage through the pump or pumps.

Having now described our invention, what we claim as new and desire to secure by Letters Patent, is as follows:—

1. In an absorption refrigerating apparatus, the combination with a generator, a condenser and an evaporator, of a mechanical device for effecting a circulation of weak liquor from and strong liquor to the generator, and a mechanical device for imparting sufficient pressure to the gaseous refrigerant from the evaporator as to cause the same to be absorbed by the circulating liquor, without effecting a reduction in temperature thereof, substantially as set forth.

2. In an absorption refrigerating apparatus, the combination with a generator, a condenser and evaporator, of a weak liquor line leading from the generator, a reducing valve therein so as to reduce the pressure of the weak liquor, a mechanical device for restoring the pressure on the liquor and effecting a return circulation to the generator, and a mechanical device for forcing the gaseous refrigerant from the evaporator under sufficient pressure as to be absorbed by the circulating liquor before pressure thereto is restored, without effecting a reduction in the temperature thereof, substantially as set forth.

3. In an absorption refrigerating apparatus, the combination with a generator, a condenser and an evaporator, of a rotary pump for effecting a circulation of weak liquor from and strong liquor to the generator, and a rotary gas pump for forcing the gaseous refrigerant from the evaporator under sufficient pressure as to be absorbed by the circulating liquor, without effecting a reduction in temperature thereof, substantially as set forth.

4. In an absorption refrigerating apparatus, the combination with a generator, a condenser and an evaporator, a weak liquor pipe leading from the generator, a reducing valve therein to reduce the pressure of the weak liquor, a rotary pump for restoring the pressure and returning the strong liquor to the generator, and a gas pump for forcing the gaseous refrigerant under sufficient pressure as to be absorbed by the low pressure weak liquor, without effecting a reduction in temperature thereof, substantially as set forth.

5. In an absorption refrigerating apparatus, the combination with a generator, a condenser and an evaporator, of a weak liquor pipe leading from the generator, a reducing valve therein, a rotary liquid pump having a plurality of stages connected with the weak liquor pipe, a strong liquor pipe leading from the discharge of said pump to the generator and a rotary gas pump for forcing the gaseous refrigerant from the evaporator under sufficient pressure as to be absorbed by the low pressure weak liquor, without effecting a reduction in temperature thereof, substantially as and for the purposes set forth.

This specification signed by us, the said THOMAS CARRIGAN and ANDREW J. SWEENEY, and witnessed this 29th day of April, 1916.

THOMAS CARRIGAN.
ANDREW J. SWEENEY.

Witnesses:
ANNA E. RENTON,
W. STRONG.